(12) United States Patent
Molinari

(10) Patent No.: US 11,759,681 B2
(45) Date of Patent: Sep. 19, 2023

(54) SPORTS BALL WITH STAGGERED SURFACE FEATURES

(71) Applicant: NIKE, Inc., Beaverton, OR (US)

(72) Inventor: Arthur Parker Molinari, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 216 days.

(21) Appl. No.: 17/179,922

(22) Filed: Feb. 19, 2021

(65) Prior Publication Data

US 2021/0260446 A1 Aug. 26, 2021

Related U.S. Application Data

(60) Provisional application No. 62/979,715, filed on Feb. 21, 2020.

(51) Int. Cl.
*A63B 41/08* (2006.01)
*A63B 45/00* (2006.01)
(Continued)

(52) U.S. Cl.
CPC ............. *A63B 45/00* (2013.01); *A63B 41/08* (2013.01); *A63B 41/10* (2013.01);
(Continued)

(58) Field of Classification Search
CPC ............... A63B 41/08; A63B 2225/01; A63B 2243/0025
See application file for complete search history.

(56) References Cited

U.S. PATENT DOCUMENTS 1,931,429 A 10/1933 Buckner et al.
2,182,052 A 12/1939 Reach
(Continued)

FOREIGN PATENT DOCUMENTS

BE 1016122 A6 3/2006
DE 19905046 A1 * 8/2000 ............. A63B 41/08
(Continued)

OTHER PUBLICATIONS

Kotschick, Dieter, "The Topology and Combinatorics of Soccer Balls", Aug. 2006, American Scientist, vol. 94, No. 4, pp. 1-18. (Year: 2006).*

(Continued)

*Primary Examiner* — Steven B Wong
(74) *Attorney, Agent, or Firm* — Quinn IP Law

(57) ABSTRACT

A sports ball may include an interior bladder and a cover disposed about the bladder. The cover comprises a plurality of adjoining panels, wherein each panel defines a plurality of panel edges that each extend in a predetermined edge direction along an edge length of less than 7.5 centimeters. The cover may further define a plurality of interior channels. Each interior channel extends in a predetermined channel direction along a channel length of less than 7.5 centimeters. The panel edges and the interior channels are staggered, such that each edge direction is obliquely angled with respect to each of the other edge directions, and each interior channel direction is obliquely angled with respect to each of the other interior channel directions and each of the edge directions of the respective panel. Such an arrangement limits directional feature length and promotes a balanced topography upon the exterior surface of the ball.

19 Claims, 9 Drawing Sheets

(51) Int. Cl.
*A63B 41/10* (2006.01)
*B33Y 10/00* (2015.01)
*B33Y 80/00* (2015.01)

(52) U.S. Cl.
CPC ....... *A63B 2209/00* (2013.01); *A63B 2225/01* (2013.01); *A63B 2243/0025* (2013.01); *B33Y 10/00* (2014.12); *B33Y 80/00* (2014.12)

(56) References Cited

U.S. PATENT DOCUMENTS

| | | | |
|---|---|---|---|
| 2,245,115 A | 6/1941 | Reach | |
| 2,859,040 A | 11/1958 | Gow | |
| 3,512,777 A | 5/1970 | Henderson | |
| 4,318,544 A | 3/1982 | Brine, Jr. | |
| 4,337,944 A | 7/1982 | Massino | |
| 4,542,902 A | 9/1985 | Massino | |
| 4,736,948 A | 4/1988 | Thomas | |
| 4,830,373 A * | 5/1989 | Dehnert | A63B 41/08 |
| | | | D21/714 |
| 4,928,962 A | 5/1990 | Finley | |
| 4,991,842 A | 2/1991 | Finley | |
| 5,354,053 A | 10/1994 | Ratner et al. | |
| D357,958 S | 5/1995 | Audero, Jr. | |
| 5,427,372 A | 6/1995 | Ratner et al. | |
| 5,451,046 A | 9/1995 | Batton | |
| 5,518,234 A | 5/1996 | Palmquist | |
| 5,683,316 A | 11/1997 | Campbell | |
| 5,735,761 A | 4/1998 | Palmquist | |
| 5,851,161 A | 12/1998 | Sassak | |
| D408,876 S | 4/1999 | Feeney | |
| 5,931,752 A | 8/1999 | Guenther et al. | |
| 5,984,812 A | 11/1999 | Sassak | |
| 6,012,997 A | 1/2000 | Mason | |
| 6,283,881 B1 | 9/2001 | Feeney | |
| 6,302,815 B1 | 10/2001 | Shishido et al. | |
| 6,406,389 B1 | 6/2002 | Feeney et al. | |
| 6,422,961 B1 | 7/2002 | Feeney | |
| 6,503,162 B1 | 1/2003 | Shishido et al. | |
| 6,685,585 B2 | 2/2004 | Shishido et al. | |
| 6,916,263 B1 * | 7/2005 | Pacheco | A63B 41/08 |
| | | | 473/607 |
| 6,988,969 B2 | 1/2006 | Avis | |
| 7,300,357 B2 | 11/2007 | Breaker et al. | |
| 7,614,959 B1 | 11/2009 | Gentile | |
| 7,654,880 B2 | 2/2010 | Schneider | |
| 7,854,671 B2 | 12/2010 | Lalvani | |
| 3,002,652 A1 | 8/2011 | Wong | |
| 8,182,379 B2 | 5/2012 | Rapaport et al. | |
| 8,216,098 B2 | 7/2012 | Lalvani | |
| 8,262,519 B2 | 9/2012 | Raynak et al. | |
| 8,371,971 B2 | 2/2013 | Bevier | |
| 8,529,386 B2 | 9/2013 | Nuernberg et al. | |
| 8,579,743 B2 | 11/2013 | Cohen et al. | |
| 8,597,144 B2 | 12/2013 | Chang et al. | |
| 8,608,599 B2 | 12/2013 | Raynak et al. | |
| 8,617,011 B2 * | 12/2013 | Berggren | B29C 65/08 |
| | | | 473/604 |
| D697,566 S * | 1/2014 | Smith | D21/713 |
| 8,672,783 B2 | 3/2014 | Fujikura et al. | |
| 8,684,870 B2 | 4/2014 | Ito et al. | |
| 8,708,847 B2 | 4/2014 | Berggren et al. | |
| 8,777,787 B2 | 7/2014 | Raynak et al. | |
| 8,845,466 B2 | 9/2014 | Bevier | |
| 8,852,039 B2 | 10/2014 | White et al. | |
| 8,926,459 B2 | 1/2015 | Berggren et al. | |
| 8,974,330 B2 | 3/2015 | Berggren et al. | |
| 9,149,701 B1 | 10/2015 | Bramlette | |
| 9,254,424 B2 | 2/2016 | Berggren et al. | |
| 9,272,190 B2 | 3/2016 | Tompkins | |
| 9,327,167 B2 | 5/2016 | Raynak et al. | |
| 9,370,693 B2 * | 6/2016 | Berggren | A63B 45/00 |
| 9,370,695 B2 | 6/2016 | Chang et al. | |
| 9,452,322 B2 | 9/2016 | Thurman et al. | |
| 9,457,239 B2 | 10/2016 | White et al. | |
| 9,457,525 B2 | 10/2016 | Berggren et al. | |
| 9,468,815 B2 | 10/2016 | Berggren et al. | |
| 9,486,675 B1 | 11/2016 | White | |
| 9,504,880 B2 | 11/2016 | Bevier | |
| 9,539,473 B2 | 1/2017 | Berggren et al. | |
| D786,374 S | 5/2017 | Deaton et al. | |
| D786,375 S | 5/2017 | Deaton et al. | |
| 9,694,247 B2 | 7/2017 | Nurnberg | |
| 9,814,941 B2 | 11/2017 | Cohen et al. | |
| 9,821,195 B2 | 11/2017 | Raynak et al. | |
| 9,855,469 B2 | 1/2018 | Berggren et al. | |
| 9,884,227 B2 | 2/2018 | Berggren et al. | |
| 9,919,483 B2 | 3/2018 | Nurnberg | |
| D819,758 S * | 6/2018 | Iqbal | D21/713 |
| 10,016,935 B2 | 7/2018 | Berggren et al. | |
| D863,473 S | 10/2019 | Smith | |
| D863,474 S | 10/2019 | Smith | |
| 11,117,023 B2 * | 9/2021 | Nagao | A63B 41/08 |
| 2003/0203779 A1 * | 10/2003 | Avis | A63B 41/08 |
| | | | 473/604 |
| 2004/0142780 A1 | 7/2004 | Estefano | |
| 2006/0105866 A1 | 5/2006 | Ma | |
| 2006/0205544 A1 | 9/2006 | Wyner et al. | |
| 2006/0229150 A1 * | 10/2006 | Ou | A63B 41/08 |
| | | | 473/604 |
| 2007/0082768 A1 * | 4/2007 | Chen | A63B 45/00 |
| | | | 473/604 |
| 2007/0117662 A1 | 5/2007 | Ma | |
| 2008/0032834 A1 | 2/2008 | Krysiak | |
| 2008/0287218 A1 | 11/2008 | Freund | |
| 2009/0042659 A1 | 2/2009 | Breaker et al. | |
| 2009/0082144 A1 * | 3/2009 | Pacheco | A63B 41/08 |
| | | | 473/604 |
| 2009/0325742 A1 | 12/2009 | Krysiak | |
| 2011/0012309 A1 | 1/2011 | Schreff | |
| 2011/0070982 A1 * | 3/2011 | Avis | A63B 41/08 |
| | | | 473/604 |
| 2011/0152018 A1 | 6/2011 | Walling et al. | |
| 2011/0250819 A1 | 10/2011 | Tashman | |
| 2011/0250997 A1 | 10/2011 | Walling et al. | |
| 2012/0172160 A1 | 7/2012 | Marc | |
| 2013/0005520 A1 | 1/2013 | Chang et al. | |
| 2013/0059683 A1 | 3/2013 | Krysiak et al. | |
| 2013/0260927 A1 | 10/2013 | Thurman et al. | |
| 2014/0038741 A1 | 2/2014 | Brooks | |
| 2014/0179468 A1 | 6/2014 | Berggren et al. | |
| 2015/0367183 A1 * | 12/2015 | Ou | A63B 41/08 |
| | | | 156/278 |
| 2016/0082323 A1 | 3/2016 | Higa et al. | |
| 2016/0089580 A1 | 3/2016 | Nurnberg | |
| 2016/0243408 A1 | 8/2016 | Tompkins | |
| 2016/0263444 A1 | 9/2016 | Nurnberg | |
| 2016/0288438 A1 | 10/2016 | Chang et al. | |
| 2016/0346627 A1 | 12/2016 | Le et al. | |
| 2016/0346964 A1 | 12/2016 | Nurnberg et al. | |
| 2017/0050089 A1 | 2/2017 | Olivares Velasco | |
| 2017/0246512 A1 | 8/2017 | Berggren et al. | |
| 2017/0291076 A1 | 10/2017 | Campbell | |
| 2017/0354851 A1 | 12/2017 | Lyon | |
| 2018/0078827 A1 | 3/2018 | Berggren et al. | |
| 2018/0111024 A1 | 4/2018 | Ou | |
| 2018/0133562 A1 | 5/2018 | Berggren et al. | |
| 2018/0154220 A1 | 6/2018 | Campbell | |
| 2018/0161635 A1 * | 6/2018 | Ahmed | A63B 41/08 |
| 2018/0161636 A1 | 6/2018 | Ahmed | |
| 2018/0169483 A1 | 6/2018 | Ou | |
| 2018/0200969 A1 | 7/2018 | Nurnberg | |
| 2018/0243614 A1 | 8/2018 | Berggren et al. | |
| 2018/0243615 A1 | 8/2018 | Berggren et al. | |
| 2018/0339202 A1 | 11/2018 | Molinari | |
| 2019/0118043 A1 * | 4/2019 | Ou | A63B 41/08 |
| 2019/0184242 A1 | 6/2019 | Molinari | |
| 2020/0070011 A1 | 3/2020 | Molinari et al. | |
| 2020/0070012 A1 | 3/2020 | Molinari | |

(56) References Cited

U.S. PATENT DOCUMENTS

| | | |
|---|---|---|
| 2020/0171359 A1 | 6/2020 | Molinari |
| 2020/0230468 A1 | 7/2020 | Molinari et al. |

FOREIGN PATENT DOCUMENTS

| | | | | |
|---|---|---|---|---|
| EP | 0885636 A1 * | 12/1998 | | |
| EP | 0885636 A1 | 12/1998 | | |
| GB | 2375054 A | 11/2002 | | |
| GB | 2447845 A | 10/2008 | | |
| WO | WO-2004018053 A1 * | 3/2004 | ............. | A63B 41/08 |
| WO | 2005115561 A1 | 12/2005 | | |
| WO | WO-2008122370 A1 * | 10/2008 | ............. | A63B 41/08 |

OTHER PUBLICATIONS

Puzzling Stack Exchange, "How many equal-sized polygons can be used to cover a soccer ball?", Oct. 7, 2014 [retrieved Mar. 7, 2023], retrieved from the Internet <URL: https://puzzling.stackexchange.com/questions/2614/how-many-equal-sized-polygons-can-be-used-to-cover-a-soccer-ball> (Year: 2014).*

Adrian L. Kiratidis and Derek B. Leinweber, An Aerodynamic Analysis of Recent FIFA World Cup Balls, Special Research Centre for the Subatomic Structure of Matter, Department of Physics, The University of Adelaide, SA, 5005, Australia, Feb. 20, 2018.

F. Alam, H. Chowdhury, B. Loganathan, I. Mustary and S. Watkins, Aerodynamic Drag of Contemporary Soccer Balls, 19th Australasian Fluid Mechanics Conference, Melbourne, Australia, Dec. 2014.

Firoz Alam, Harun Chowdhury, Mark Stemmer, Zilong Wang and Jie Yang, Effects of surface structure on soccer ball aerodynamics, Procedia Engineering 34 (2012) pp. 146-151, Published by Elsevier Ltd.

John Eric Goff, Matt J. Carre, Investigations into soccer aerodynamics via trajectory analysis and dust experiments, Procedia Engineering 34 (2012) pp. 158-163, Published by Elsevier Ltd.

John Eric Goff, Sungchan Hong and Takeshi Asai, Aerodynamic and surface comparisons between Telstar 18 and Brazuca, Journal of Sports Engineering and Technology, 2018, pp. 1-7, DOI: 10.1177/1754337118773214.

Luca Oggiano, Lars Saetran, Aerodynamics of modern soccer balls, Procedia Engineering 2 (2010) pp. 2473-2479, Published by Elsevier Ltd.

Pouya Jalilian, Patrick K. Kreun, Mohammadhady M. Makhmalbaf and William W. Liou, Computational Aerodynamics of Baseball, Soccer Ball and Volleyball, American Journal of Sports Science, vol. 2, No. 5, 2014, pp. 115-121, doi: 10.11648/j.ajss.20140205.12.

Sungchan Hong and Takeshi Asai, Aerodynamic effects of dimples on soccer ball surfaces, Heliyon 3 (2017) e00432, doi: 10.1016/j.heliyon.2017.e00432.

Sungchan Hong and Takeshi Asai, Effect of panel shape of soccer ball on its flight characteristics, Sci. Rep 4, 5068; DOI:10.1038/srep05068 (2014).

T. Asai, K. Seo, O. Kobayashi and R. Sakashita, Fundamental aerodynamics of the soccer ball, Sports Engineering (2007) 10, pp. 101-110.

Takeshi Asai, Kazuya Seo, Aerodynamic drag of modern soccer balls, SpringerPlus 2013, 2:171, Published Apr. 19, 2013.

* cited by examiner

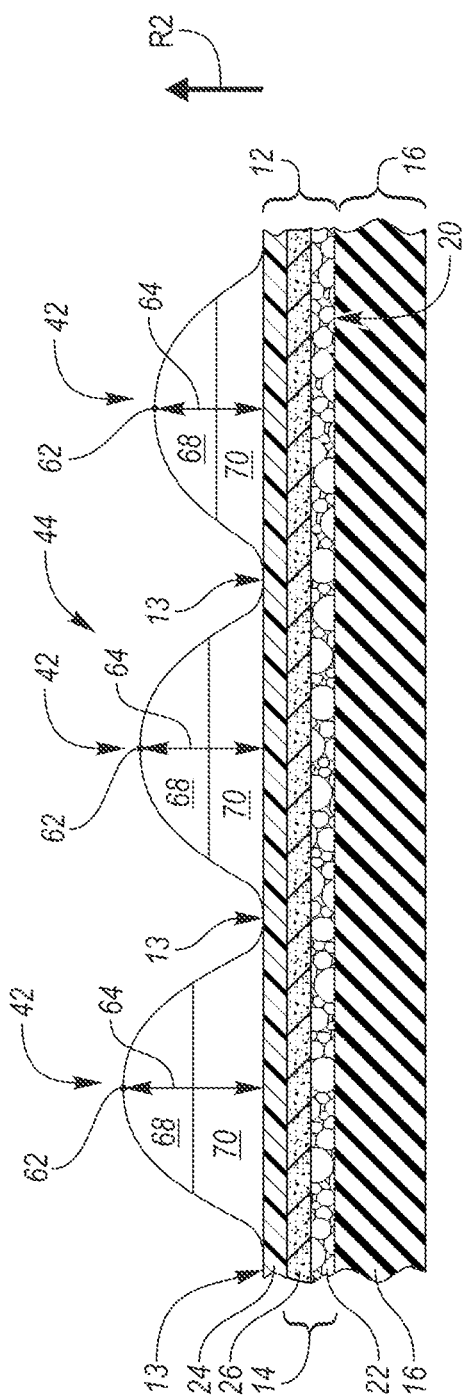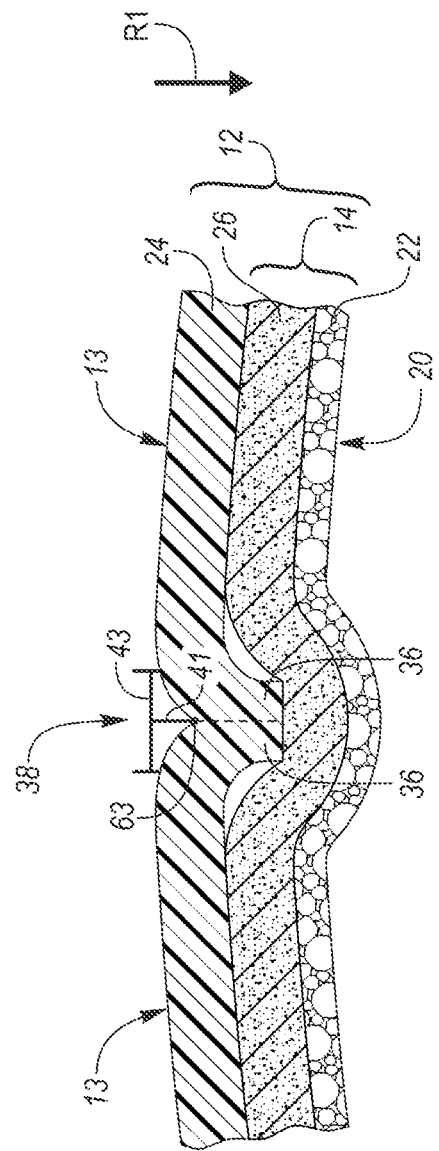

SPORTS BALL WITH STAGGERED SURFACE FEATURES

CROSS REFERENCE TO RELATED APPLICATIONS

This application claims the benefit of U.S. Provisional Application No. 62/979,715, filed Feb. 21, 2020, which is hereby incorporated by reference in its entirety.

TECHNICAL FIELD

The disclosure relates to inflatable sports balls.

BACKGROUND

A variety of inflatable sport balls, such as soccer balls, conventionally exhibit a layered structure that includes a casing, an intermediate structure, and a bladder. The casing forms an exterior portion of the sports ball and is generally formed from a plurality of durable and wear-resistant panels joined together along abutting edge areas (e.g., with stitching, adhesives, or bonding), i.e., via a seam. Designs such as decorative elements and holistic textural patterns may be applied to the exterior surface of the casing. Decorative elements are conventionally applied via processes such as thermal transfer films or a release paper. Textural patterns are conventionally applied via processes such as embossing, debossing, stamping, molding, or laser etching.

The intermediate structure forms a middle portion of the sport ball and is positioned between the casing and the interior. Among other purposes, the intermediate structure may provide a softened feel to the sports ball, impart energy return, and restrict expansion of the bladder. In some configurations, the intermediate structure or portions of the intermediate structure may be bonded, joined, or otherwise incorporated into the casing as a backing material. In other configurations, the intermediate structure or portions of the intermediate structure may be bonded, joined, or otherwise incorporated into the interior.

SUMMARY

A sports ball is provided. The sports ball may include a cover comprising an outer substrate that defines an exterior surface of the sports ball. The outer substrate further includes a plurality of panels. When disposed in a planar configuration, prior to assembly, each panel defines a plurality of edges that extend in a predetermined edge direction along an edge length. Further, the edge length is less than 7.5 centimeters. During assembly, of the sports ball, adjoining panels may be coupled to one another at the respective edges via a plurality of seams. Accordingly, the respective seam length of each seam is likewise less than 7.5 centimeters.

Further, when disposed in a planar configuration, prior to assembly, each panel may further define a plurality of indentations extending radially inward from the exterior surface. Each interior channel extends in a predetermined channel direction along a channel length, wherein the channel length is less than 4.5 centimeters. As such, upon assembly of the sports ball, when the respective panels are joined at the respective edges via seams, each seam and/or interior channel has a feature length of less than 4.5 centimeters.

Further, when each panel is disposed in a planar configuration, prior to assembly, the predetermined edge direction of each edge may be different than the other predetermined edge direction of each of the other edges, each predetermined channel direction may be different than the predetermined channel direction of each of the other channels, and each predetermined edge direction may be different than the predetermined channel direction of each of the channels. Said another way, the seams and interior channels are staggered.

Such an arrangement of indentations (seams and/or interior channels) on the exterior surface of the assembled ball limits indentation or feature length in any one predetermined direction to promote a balanced and substantially symmetrical topographical arrangement of indentations across the exterior surface of the ball. The balanced topographical designs avoid uneven lift of the ball and improves consistency of the ball when kicked in any orientation and may allow for optimization of consistency and improved aerodynamics.

BRIEF DESCRIPTION OF THE DRAWINGS

FIG. 9 is an enlarged, schematic, example cross-sectional view of a plurality of protrusions disposed on the cover shown in FIG. 3, taken along line 9-9.

FIG. 10 is an enlarged, schematic, example cross-section of a seam, as shown in FIG. 1, taken along line 10-10.

DETAILED DESCRIPTION

Figure 1:
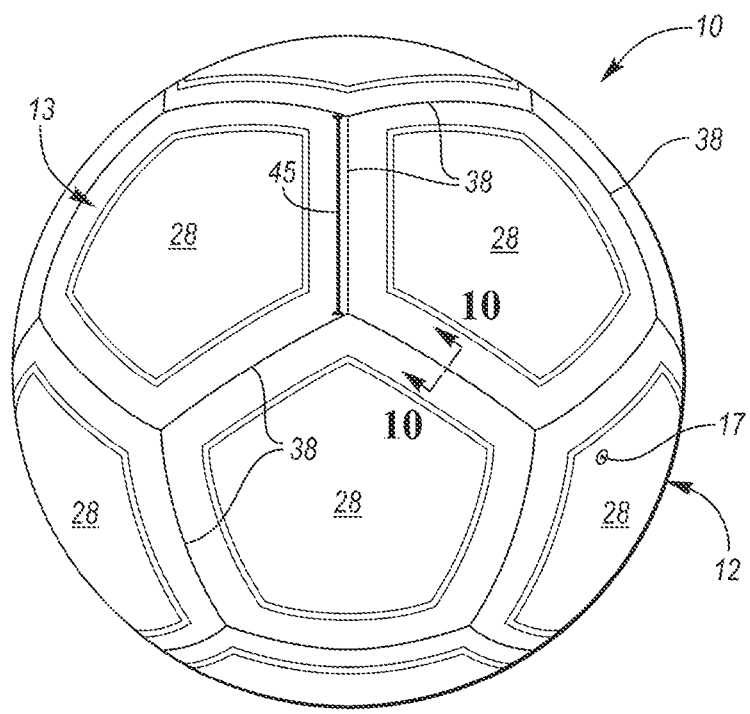
FIG. 1 is a schematic perspective view of an example inflatable sports ball.

While the present disclosure may be described with respect to specific applications or industries, those skilled in the art will recognize the broader applicability of the disclosure. Those having ordinary skill in the art will recognize that terms such as "above", "below", "upward", "downward", etc., are used descriptively of the figures, and do not represent limitations on the scope of the disclosure, as defined by the appended claims. Any numerical designations, such as "first" or "second" are illustrative only and are not intended to limit the scope of the disclosure in any way.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

The terms "a", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

The following discussion and accompanying figures disclose various sports ball configurations and methods relating to manufacturing of the sport balls. Although the sports ball is depicted as a soccer ball in the associated Figures, concepts associated with the configurations and methods may be applied to various types of inflatable sport balls, such as basketballs, footballs (for either American football or rugby), volleyballs, water polo balls, etc. and variety of non-inflatable sports balls, such as baseballs and softballs, may also incorporate concepts discussed herein.

Referring to the drawings, wherein like reference numerals refer to like components throughout the several views, a sports ball 10 is provided. In a general sense, the sports ball 10 of the present disclosure includes a cover 12 comprising an outer substrate 24 that defines the exterior surface 13 of the ball 10. The outer substrate 24 may include a plurality of panels 28, each having a plurality of edges 36. Adjacent or adjoining panels 28, during assembly, may be coupled at the edges 36 via seams 38.

The cover further defines a plurality of indentations 34, 38, i.e., a plurality of seams 38 configured to couple a plurality of adjoining outer panels 28 and/or a plurality of interior channels 34 or debossed features. Each indentation 34, 38 extends in a predetermined direction along a length 45, 50. The predetermined direction of each indentation 34, 38 is different than the predetermined direction of each of the other indentations 34, 38 and the indentation length 45, 50 is limited to less than 7.5 centimeters. Said another way, no seam 38, interior channel 34, or other debossed feature extends in any one direction along a length 45, 50 of greater than 7.5 centimeters.

Such an arrangement of indentations 34, 38 on the exterior surface 13 of the assembled sports ball 10 limits directional indentation or feature length to promote a balanced and substantially symmetrical topographical arrangement 56 of indentations 34, 38 across the exterior surface 13 of the ball 10. Such balanced topographical designs 56 avoid uneven lift of the ball 10 and improves consistency of the ball 10 when kicked in any orientation and may allow for optimization of consistency and improved aerodynamics.

As shown in FIGS. 1-4 and 6, the sports ball 10 may be an inflatable sports ball such as a soccer ball or the like or a non-inflatable sports ball 10 such as a softball or the like. A sports ball 10 having the general configuration of a soccer ball is depicted in FIGS. 1-4 and 6. When embodied as an inflatable soccer ball, as depicted in FIGS. 1-4 and 6, the ball 10 may be manufactured to at least the standards set forth by Federation Internationale de Football Association (FIFA) specifications for Size 5 FIFA Quality Pro level soccer balls, which require a circumference of from 685 millimeters to about 695 millimeters, a weight of from 420 grams to 445 grams, a sphericity max percentage of 1.5%, and a rebound height of from 135 centimeters to 155 centimeters at 20 degrees Celsius.

Figure 2:
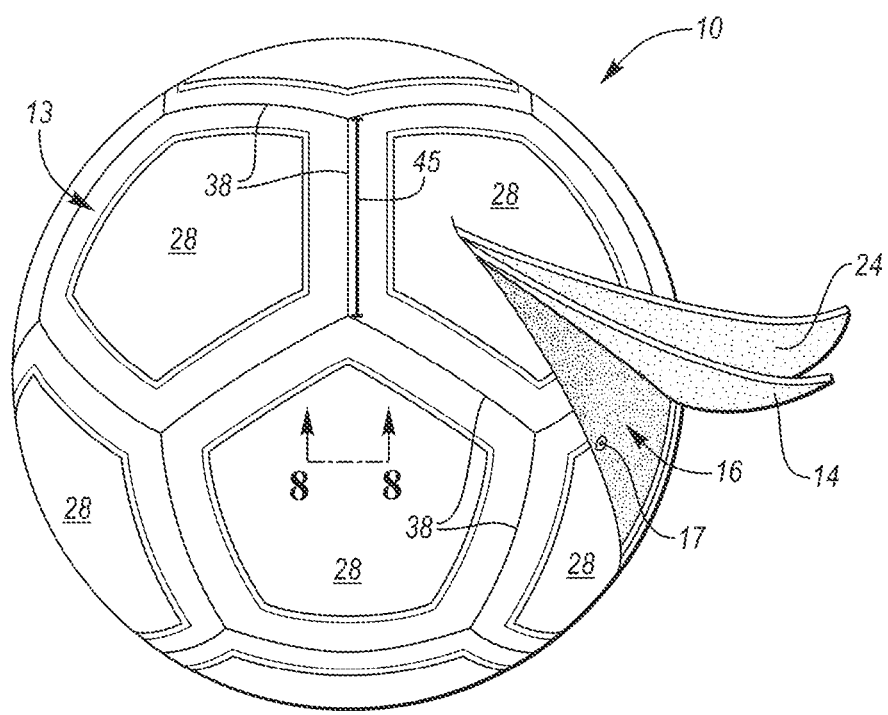
FIG. 2 is a schematic perspective view of an example inflatable sports ball, wherein the ball includes an interior bladder and a cover, the cover including an outer substrate layer and an intermediate structure.
Figure 8:
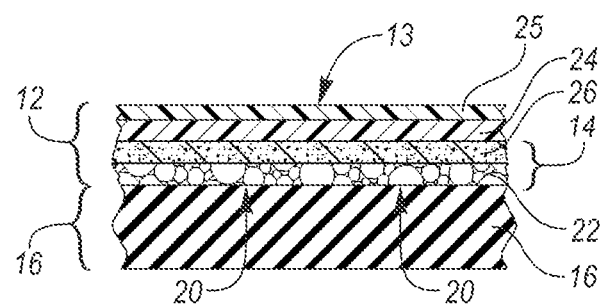
FIG. 8 is an enlarged, schematic, example cross-sectional view of the cover shown in FIG. 2, taken along line 8-8.

As shown in FIGS. 1 and 2, the sports ball 10 may have a layered structure including a cover 12 and an interior 16 (FIGS. 2 and 8-9). The cover 12 forms an exterior portion of the sports ball 10. The interior 16 forms an interior portion of sports ball 10.

In a non-inflatable example configuration of the sports ball 10, the interior 16 may be one of a solid mass and hollow mass, fixed in size. In an inflatable example configuration of the sports ball 10, the interior 16 may be an interior bladder (FIGS. 2 and 8-9). In the inflatable example configuration, in order to facilitate inflation (i.e., fill the interior with pressurized air), the interior 16 generally includes a valved opening 17 that extends through the cover 12, thereby being accessible from an exterior surface 13 of the sports ball 10. Upon inflation, the bladder 16 is pressurized and the pressurization induces the exterior surface 13 of the cover 12 to be a substantially spherical surface as the sports ball 10 takes on a substantially spherical shape. More particularly, pressure within the bladder 16 causes the bladder 16 to place an outward force upon the cover 12 on an inner substrate surface 20.

The cover 12 forms an exterior portion of the sports ball 10 and defines the exterior surface 13. The term cover 12 is meant to include any layer of the sports ball 10 that surrounds the interior 16. Thus, the cover 12 has a thickness 88 and may include both the outermost layer 24, 25 and also any intermediate layers 22, 26, which are disposed between the interior 16 and the exterior surface 13. As shown in FIGS. 2 and 8-11G, the cover 12 may be composed as a layered structure including an outer substrate layer 24 and an intermediate structure 14 located interior to the outer substrate layer 24 between the outer substrate layer 24 and the interior 16. The outer substrate layer 24 further defines the exterior surface 13. The inner substrate surface 20 is disposed opposite the exterior surface 13 and may be disposed adjacent to the ball interior 16.

In some embodiments, the outer substrate layer 24 may be composed of a polymeric material, a polymer foam material, or the like. Examples of suitable polymer materials include, but are not limited to, polyurethane, polyvinylchloride, polyamide, polyester, polypropylene, polyolefin, and the like.

The intermediate structure 14 may include a first intermediate cover layer 26 and a second intermediate cover layer 22. The first intermediate cover layer 26 is positioned between the outer substrate layer 24 and the second intermediate cover layer 22. The second intermediate cover layer 22 is positioned between the first intermediate cover layer 26 and the interior bladder 16. The second intermediate cover layer 22 may include the inner substrate surface 20, wherein the inner substrate surface 20 is positioned adjacent to the ball interior 16.

The respective cover layers 22, 26 of the intermediate structure 14 may be composed of a polymeric material, a polymer foam material, a foam material, textiles, or the like. Examples of suitable polymer materials include, but are not limited to, polyurethane, polyvinylchloride, polyamide, polyester, polypropylene, polyolefin, and the like. Examples of suitable polymer foam materials include, but are not limited to, polyurethane, ethylvinylacetate, and the like. Examples of suitable textile materials include, but are not limited to, a woven or knit textile formed from polyester, cotton, nylon, rayon, silk, spandex, or a variety of other materials. A textile material may also include multiple materials, such as a polyester and cotton blend. The intermediate structure 14 may further provide a softened feel to the sports ball 10, impart energy return, and restrict expansion of the bladder 16, in an inflatable sports ball 10 example. In one example, the outer substrate layer 24 may be formed from a thermoplastic polyurethane material (TPU), first intermediate layer 26 may be formed from a polymer foam material, the second intermediate layer 22 may be formed from one or more of a polymeric material, a polymer foam material, a foam material, or a textile material.

As shown in FIG. 8, the cover 12 may further include an external surface layer 25 disposed upon the cover 12. The external surface layer 25 may be a film that includes a pigment or a graphic thereon. The external surface layer 25 may also be an outer film or clear coat having weather resistant properties. The external surface layer 25 may be a polyurethane film or the like. The external surface layer 25 may be bonded to the outer substrate surface 18 via a suitable bonding material or adhesive.

As shown in FIGS. 1-7, the cover 12 may be generally formed by a plurality of adjoining panels 28. The plurality of panels 28 may comprise the conventional twelve (12) panels or any other number of panels 28. For example, four joined panels 28 having a generally triangular shape that is formed from three pentagons. The cover 12 may also exhibit a substantially uniform or unbroken configuration that does not include panels 28 joined at abutting edge areas 36 via seams 38 or may include fewer panels 28. In one example, the sports ball 10 has less than twelve panels 28. In another more specific example, the sports ball 10 has four panels 28.

Figure 5:
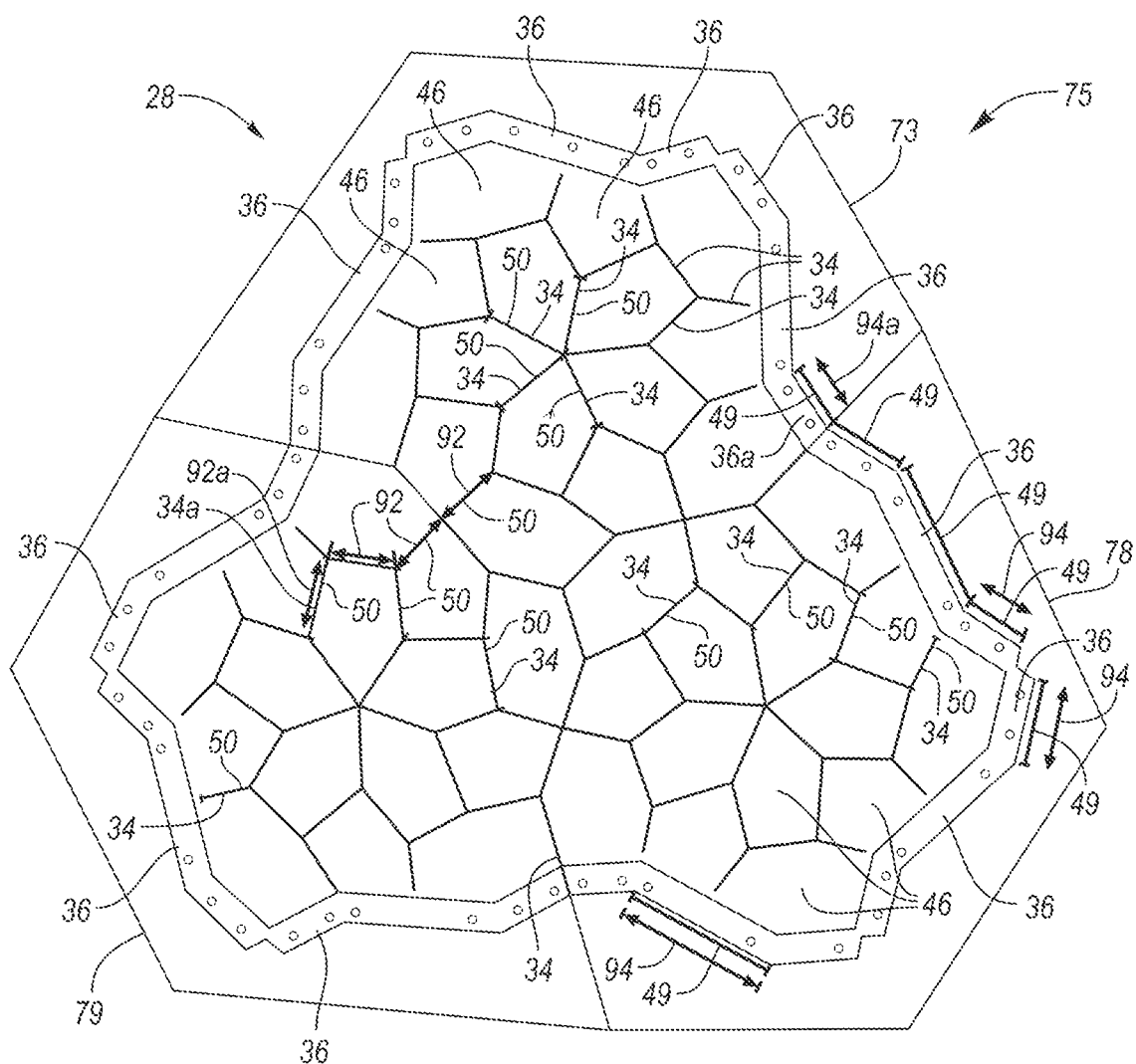
FIG. 5 is a schematic plan view of an example panel of the first example sports ball, wherein the example panel has a generally triangular shape that is formed from three pentagons.
Figure 7:
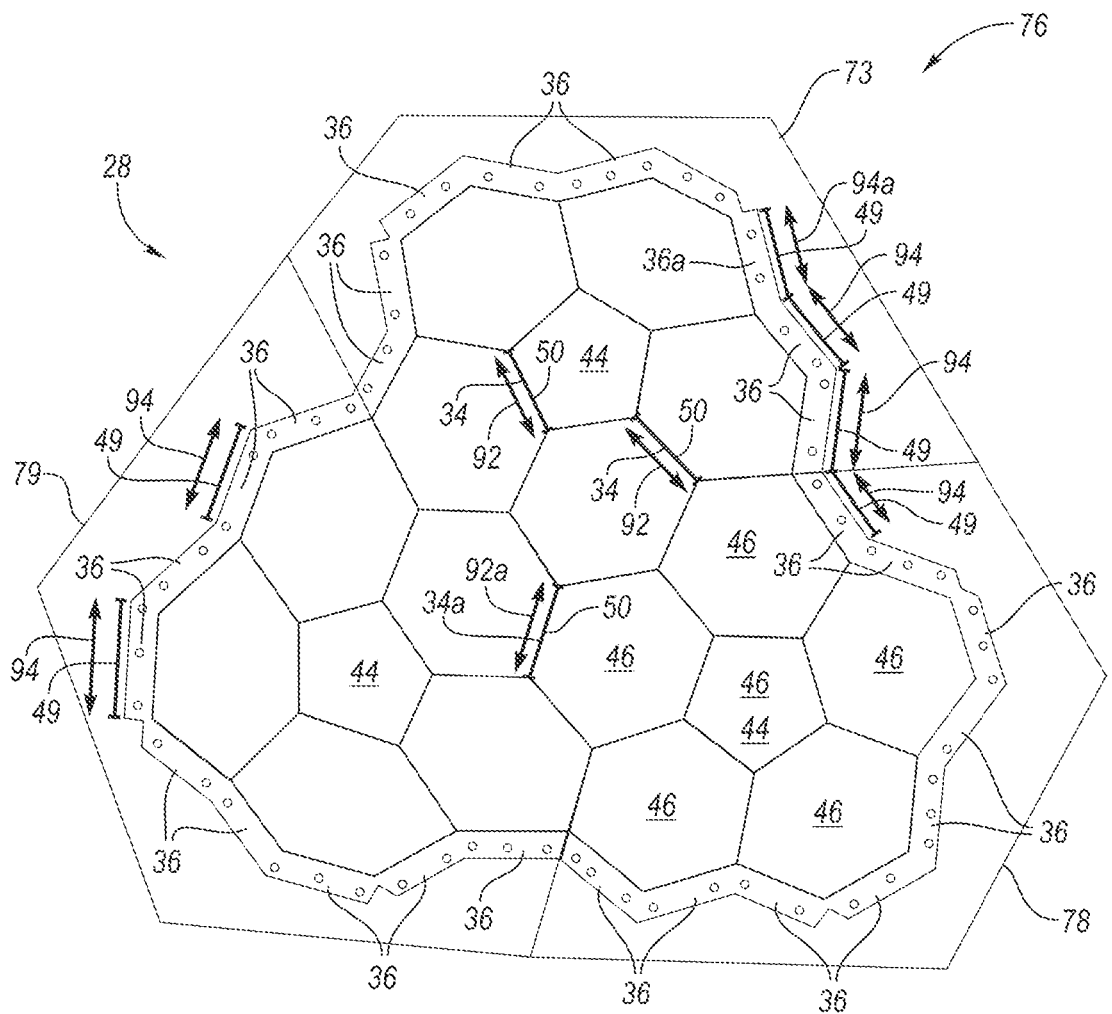
FIG. 7 is a schematic plan view of an example panel of the second example sports ball, wherein the example panel has a generally triangular shape that is formed from three pentagons.

Each panel 28 may have a respective panel surface that defines a portion of the exterior surface 13. Further, each panel 28 defines a plurality of edges 36 around a boundary or perimeter thereof. When the respective panel 28 is positioned in a planar configuration prior to assembly (FIGS. 5 and 7), each edge 36 extends in a predetermined edge direction 94 along an edge length 49. In one example, a first edge 36a extends in a first predetermined edge direction 94a, and the first predetermined edge direction 94a is different than the predetermined edge direction of each of the other edges 36. Said another way, the edges 36 of each panel 28 may be staggered as shown in FIGS. 5 and 7, in that the first predetermined edge direction 94a is obliquely angled with respect to each of the other predetermined edge directions 94 of the edges 36 of the respective panel 28. In an example four panel ball 10, as shown in FIGS. 5 and 7, each panel may have twenty-seven (27) edges 36. Additionally, in an example four panel ball, wherein each panel 28 has twenty-seven (27) edges 36, each edge length 49 is limited to less than 7.5 centimeters, and preferably less than 4.5 centimeters, such that the edges 36 are staggered in orientation and limited in length 49.

As shown in FIGS. 3-7, and 10-11G, the cover 12 may further define a plurality of indentations 34, 38. Each of the indentations of the plurality of indentations 34, 38 may extend radially inward from the exterior surface 13. The exterior surface 13 of the cover 12 may further define a plurality of plateau sections 35 disposed between the indentations 34, 38. The plurality of indentations 34, 38 may be further defined as a plurality of seams 38 and plurality of interior channels 34.

In one example, during assembly of the sports ball 10, adjacent or adjoining panels 28 may be coupled to one another at the respective edges 36 via a plurality of seams 38. The plurality of seams 38 are configured to couple the plurality of adjoining panels 28, such that each of the seams 38 is positioned between one of the plurality of adjoining panels 28 and another of the plurality of adjoining panels 28. The respective panels 28 may be coupled together along abutting edge areas 36 (FIGS. 5 and 7) via at least one seam 38 (FIGS. 1-4, 6, and 10). In an example four panel ball 10, wherein each panel has twenty-seven (27) edges the ball 10 has a total of fifty four (54) seams 38.

The panels 28 may be coupled along the abutting edge areas 36 by the seam 38 with stitching, bonding, welding, adhesives, or another suitable coupling method. As utilized herein, the term "welding" or variants thereof (such as "thermal bonding") is defined as a technique for securing two elements to one another that involves a softening or melting of a polymer material within at least one of the elements such that the materials of the elements are secured to each other when cooled. Similarly, the term "weld" or variants thereof (e.g., "thermal bond") is defined as the bond, link, or structure that joins two elements through a process that involves a softening or melting of a polymer material within at least one of the elements such that the materials of the elements are secured to each other when cooled.

An example of welded seams 38 is disclosed in U.S. Pat. No. 8,608,599 to Raynak, et al., which is hereby entirely incorporated herein by reference. U.S. Pat. No. 8,608,599 to Raynak, et al. generally discloses examples of welded seams, in that welding generally produces a heat-affected zone in which the materials of the two joined components are intermingled. This heat-affected zone may be considered a "weld" or "thermal bond." Further, welding may involve (a) the melting or softening of two panels that include polymer materials such that the polymer materials from each panel intermingle with each other (e.g., diffuse across a boundary layer between the polymer materials) and are secured together when cooled, as well as (b) the melting or softening of a polymer material in a first panel such that the polymer material extends into or infiltrates the structure of a second panel (e.g., infiltrates crevices or cavities formed in the second panel or extends around or bonds with filaments or fibers in the second panel) to secure the panels together when cooled. Further, welding may occur when only one panel includes a polymer material or when both panels include polymer materials.

Referring to FIG. 10, each seam 38 has a seam terminus 63 that is radially-spaced apart from and radially extending inward or in a first radial direction R1, from the exterior surface 13 toward the inner substrate surface 20. Further, each seam 38 has a seam depth 41 and a seam width 43. The seam terminus 63 is radially-spaced apart from the exterior surface 13 by the seam depth 41.

Further, each seam 38 may have a seam length 45 (FIGS. 1-7). In the example, wherein each of the respective edge lengths 49 is less than 7.5 centimeters, and preferably less than 4.5 centimeters, when a respective panel 28 is disposed in a planar configuration, after assembly, when the edges 36 are coupled via the plurality of seams 38, the seam length 45 of each seam 38 on the example ball 10 is likewise limited to less than 7.5 centimeters, and preferably less than 4.5 centimeters. Additionally, in such an example, each edge 36 extends in a predetermined edge direction 94 that is different than each of the predetermined edge direction 94 of each of the other edges 36. As such, upon assembly of the ball 10, i.e., coupling of the panels 28 at the edges 36 via seams 38, results in a constructed ball 10, wherein no seam 38 extends in the same predetermined seam direction as any other seam 38. Said another way, and illustrated in FIG. 3, once the sports ball 10 is assembled, if the assembled sports ball 10 is cut with a plane P through a ball center point, no more than two seams 38 will align along and in parallel with the plane P.

Referring to FIGS. 4-7 and 11A-11G, the plurality of interior channels 34 may be formed as a plurality of debossed features. The term debossed feature as used herein is defined as an indentation in the cover 12 that is not a seam 38. Debossed features may impart various advantages to the ball 10. For example, debossed features may enhance the aerodynamics of a ball 10 or provide a greater amount of consistency or control over the ball 10 during play, e.g., during kicking, dribbling, or passing.

In some example embodiments, interior channels 34 may be spaced apart from the seams 38 of the sport ball 10. In other examples, the interior channels 34 may abut or intersect the seams 38. In an example embodiment, wherein the cover 12 has a substantially uniform or unbroken configuration that does not include panels 28 or includes fewer panels, an interior channel 34 may be positioned in areas of the cover 12 that correspond with the positions of seams 38 in a conventional sports ball 10, in order to impart the appearance of seams 38.

The plurality of interior channels 34 may be formed on the cover 12 via a variety of manufacturing processes including, but not limited to, debossing. Examples of a manufacturing process for forming debossed features are disclosed in U.S. Pat. No. 9,370,693 to Berggren, et al., which is hereby entirely incorporated by reference herein. U.S. Pat. No. 9,370,693 to Berggren, et al. generally discloses a variety of manufacturing processes that may be utilized to form debossed features in panels. In one example, one of the panels 28 is located on a platen. A press plate is positioned above the platen and includes a protrusion having a predetermined shape. The protrusion presses into and heats the areas of panel 28 forming the debossed features. The press plate then moves away from panel 28 to substantially complete the formation of the debossed feature.

As shown in FIGS. 4-7, and 11A-11G, each interior channel 34 has a channel terminus 65 that is radially-spaced apart from and radially extending inward or in a first radial direction R1 from the exterior surface 13 toward the inner substrate surface 20. Further, each interior channel 34 has a channel depth 67 and a channel width 61. The channel terminus 65 is radially-spaced apart from the exterior surface 13 inwardly and in the first radial direction R1, by the channel depth 67.

Referring to FIGS. 11A-11G, the interior channels 34 are formed in the cover 12 and extend radially inward or in a first radial direction R1 from the exterior surface 13 toward the interior 16. The intermediate structure 14 is positioned between the outer substrate layer 24 and the interior bladder 16. The outer substrate layer 24 may be bonded to the intermediate structure 14 at the respective interior channel 34. More particularly, the outer substrate layer 24 may be welded directly to the second intermediate cover layer 22 at the channel terminus 65 of the respective interior channel 34 (FIGS. 11A-C and 11E-G), such that the outer substrate layer 24 extends through an entirety of the channel depth 67 at each of the interior channels 34.

The interior channels 34 may include a first portion 82 and a second portion 84. The first portion 82 has the terminus 65 thereon that is radially-spaced apart from the exterior surface 13 by the channel depth 67.

Figure 11A:
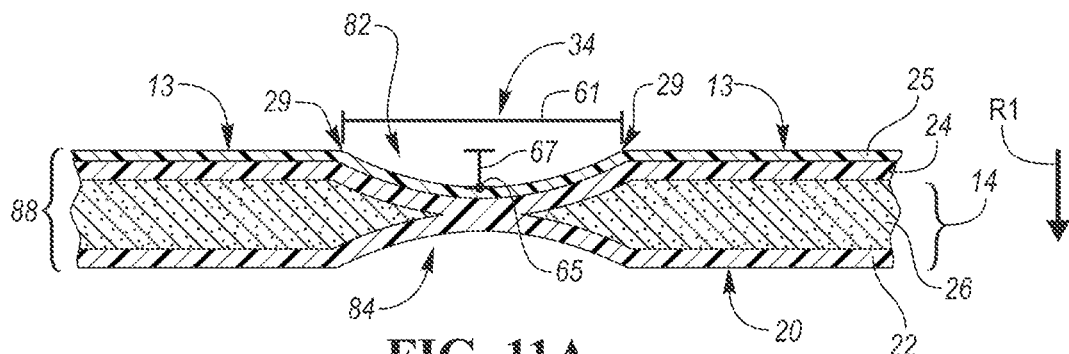
FIG. 11A is an enlarged, schematic, example cross sectional view of an indentation, wherein the indentation is defined as an interior channel.
Figure 11B:
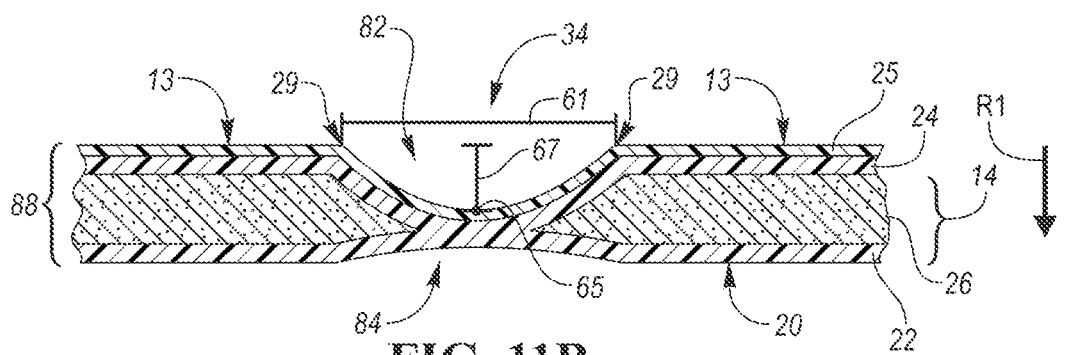
FIG. 11B is an enlarged, schematic, example cross sectional view of an indentation, wherein the indentation is defined as an interior channel.
Figure 11C:
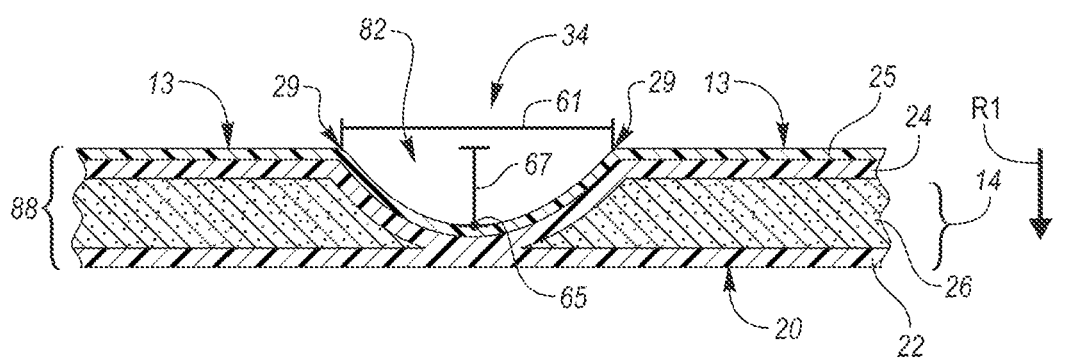
FIG. 11C is an enlarged, schematic, example cross sectional view of an indentation, wherein the indentation is defined as an interior channel.

The specific configuration of the interior channels 34 may vary considerably. Referring to FIG. 11A-11D, the first portion 82 and the second portion 84 may have a generally rounded configuration. As depicted in FIG. 11A the first and second portions 82 and 84 extend to an approximate midpoint of the thickness 88 of the panel cross-section. In another configuration, as depicted in FIGS. 11B and 11C, the first portion 82 extends through more of the thickness 88 of panel cross section than the second portion 84. In yet another configuration, as depicted in FIG. 11C, the first portion 82 extends through substantially all of the thickness 88 of panel cross-section. As also shown in FIG. 11C, in some embodiments, the second intermediate layer 22 may have a substantially planar configuration opposite the first portion 82. Said another way, in some embodiments, the interior channel 34 may have only a first portion 82 and no second portion 84.

Figure 11D:
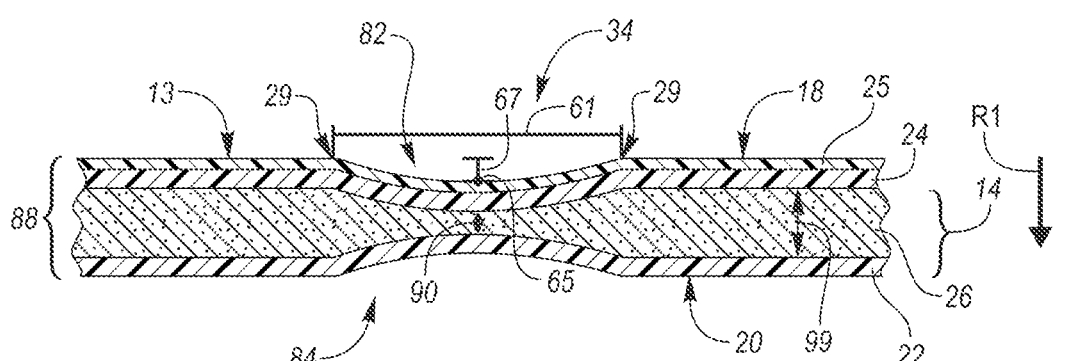
FIG. 11D is an enlarged, schematic, example cross sectional view of an indentation, wherein the indentation is defined as an interior channel.

Referring to FIG. 11D, the first and second portions 82 and 84, as well as the outer substrate layer 24 and the second intermediate cover layer 22, may be spaced from each other, such that a portion of the first intermediate layer 26 extends between portions 82, 84 and between the outer substrate layer 24 and the second intermediate cover layer 22. In this configuration, the outer substrate layer 24 is bonded to the first intermediate layer 26 at the respective interior channel 34. In such an example, the first intermediate layer 26 has a first thickness 90 between portions 82, 84 and at the terminus 65 of the first portion 82. In the same example, the first intermediate layer 26 has a second thickness 99 between the outer substrate layer 24 and the second intermediate cover layer 22 in an area spaced apart from portions 82, 84 and the terminus 65 of the first portion 82. As shown in FIG. 11D, the first thickness 90 is less than the second thickness 99.

Figure 11E:
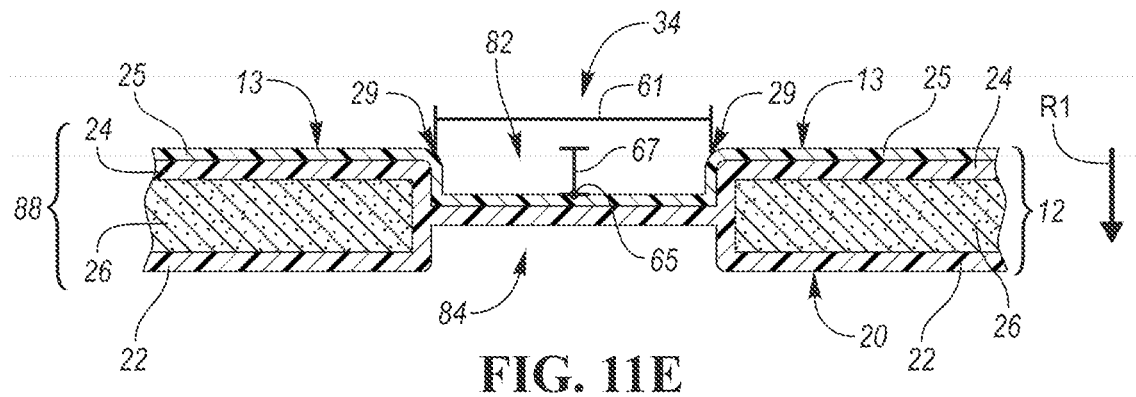
FIG. 11E is an enlarged, schematic, example cross sectional view of an indentation, wherein the indentation is defined as an interior channel.
Figure 11F:
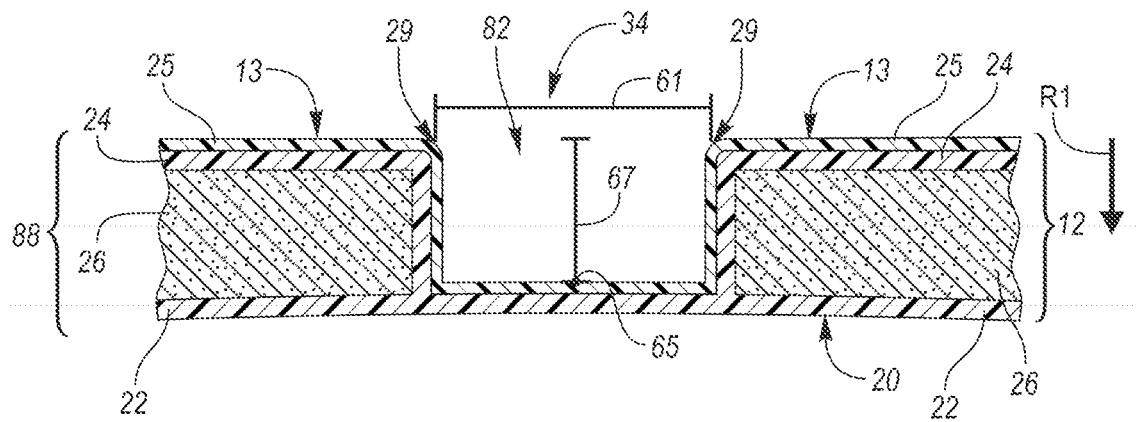
FIG. 11F is an enlarged, schematic, example cross sectional view of an indentation, wherein the indentation is defined as an interior channel.
Figure 11G:
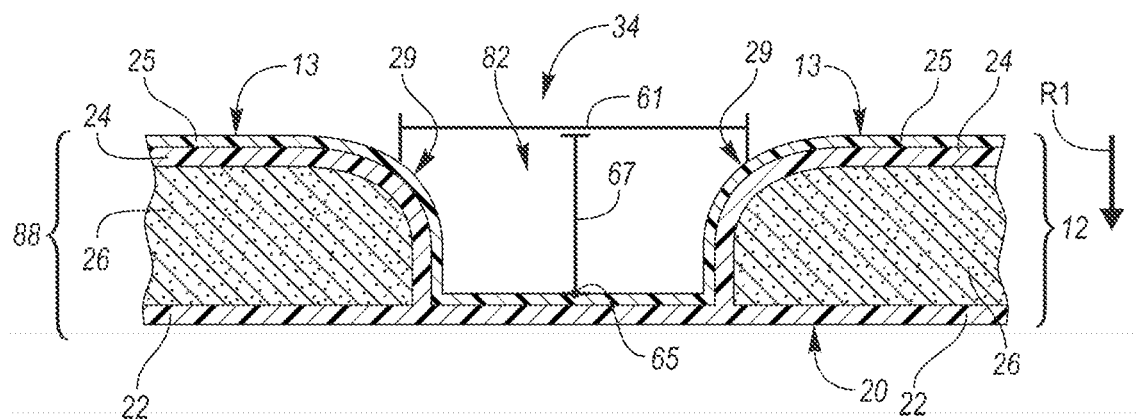
FIG. 11G is an enlarged, schematic, example cross sectional view of an indentation, wherein the indentation is defined as an interior channel.

Alternatively, the interior channels 34 may include a first portion 82 and a second portion 84 that exhibit substantially squared configurations (FIGS. 11E-11G). For example, in some embodiments, the portions 82, 84 may have substantially squared cross-sectional configurations. Interior channels 34 with substantially squared cross-sectional configurations may have a more distinct appearance than portions 82, 84 having substantially rounded cross-sectional configurations. In addition, interior channels 34 with substantially squared portions 82, 84 may also provide performance benefits such as aerodynamics, ball feel, and water channeling.

As shown in FIG. 11E, the first portion 82 and second portion 84 are two opposing indentations having substantially squared cross-sectional configurations. In FIG. 11E, the indentations 82, 84 extend to an approximate midpoint of the thickness 88 of the panel cross-section, such that the channel terminus 65 of the first portion 82 is positioned radially inward from the exterior surface 13 to the approximate midpoint of the thickness 88 of the panel cross-section.

In FIGS. 11F-11G, the first portion 82 may extend through substantially the entirety of the thickness 88 of the panel cross section. As also shown in FIG. 11F-11G, in some embodiments, second intermediate layer 22 may have a substantially planar configuration opposite the first portion 82. Said another way, in some embodiments, the debossed feature 34 may have only a first portion 82 and no second portion 84.

As shown in FIGS. 11F-11G, in one example embodiment, the interior channel 34 may include substantially-squared first portion 82 having a rounded shoulder portion 29. In some embodiments, a substantially-squared shoulder portion 29 may have a minimal radius, as shown in FIG. 11F. In another example embodiment, a rounded shoulder portion 29 having a larger radius may be used, as shown in FIG. 11G.

Further, each interior channel 34 may have a channel length 50 (FIGS. 4-7). In one example, the channel length 50 may be limited to less than 7.5 centimeters, and preferably less than 4.5 centimeters. Further, when a respective panel 28 is disposed in a planar configuration prior to assembly (FIGS. 5 and 7), each interior channel 34 extends in a predetermined channel direction 92 along the respective channel length 50. For example, a first channel 34a (FIGS. 5 and 7) may extend in a first predetermined channel direction 92a, and the first predetermined channel direction 92a is different than the predetermined channel direction 92 of each of the other channels 34. Said another way, the interior channels 34 may be staggered on the respective panel 28 as shown in FIGS. 5 and 7, in that the first predetermined channel direction 92a is obliquely angled with respect to each of the other predetermined channel direction 92 of each of the other interior channels 34 on the respective panel 28.

Further, the first predetermined channel direction 92a may be different than the first predetermined edge direction 94a, the first predetermined channel direction 92 may also be different than the predetermined edge direction 94 of each of the other edges 36, and the first edge direction 94a is different than the predetermined channel direction 92 of each of the other interior channels 34. Said another way, the interior channels 34 and the seams 38 may be staggered on the exterior surface 13 of the resultant sports ball 10, as shown in FIGS. 5 and 7, in that the first predetermined interior channel direction 92a is obliquely angled with respect to each of the other interior channel directions 92 and each of the predetermined edge directions 94a, 94. In such an example, when a respective panel 28 is disposed in a planar configuration prior to assembly (FIGS. 5 and 7), no interior channel 34 extends in the same predetermined channel direction 92 as any other channel 34, no interior channel 34 extends in the same predetermined direction 92, as any edge 36, and no interior channel 34, nor edge 36 extends in the respective predetermined direction 92, 94 along a respective edge length 49 or a respective channel length 50 of greater than 7.5 centimeters. Said another way, and as illustrated in FIG. 3, once the sports ball 10 is assembled, if the sports ball 10 is cut with a plane P through a ball center point, no more than two indentations 34, 38 (seams 38 and interior channels 34 included), will align along and in parallel with the plane P (FIG. 3).

Figure 3:
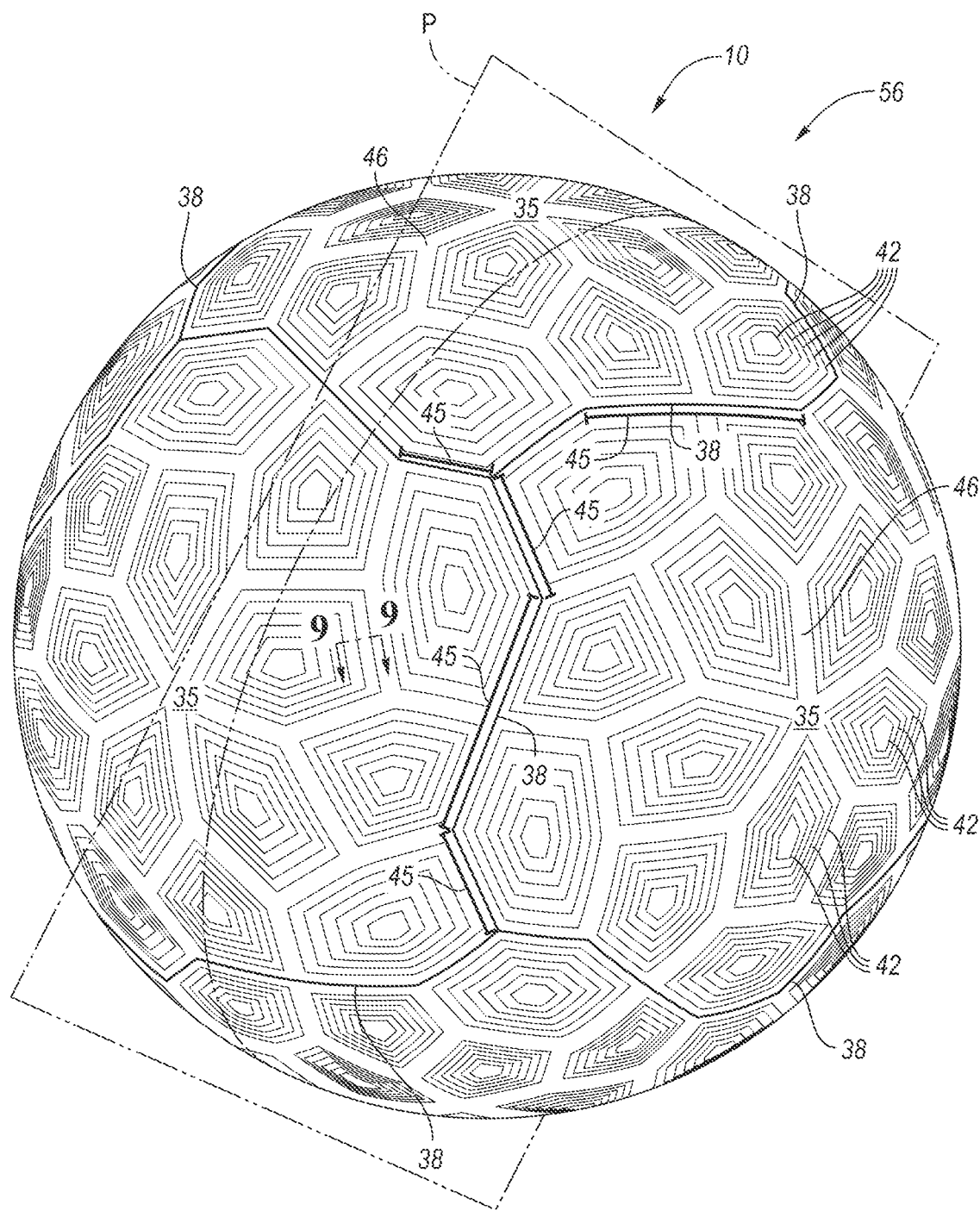
FIG. 3 is a schematic perspective view of a first example inflatable sports ball, wherein the cover defines a plurality of adjoining panels coupled via a plurality of seams.

As shown in FIGS. 3 and 9 the cover 12 may further include a plurality of protrusions 42 formed of a dimensional ink. The plurality of protrusions 42 may be disposed on and additively applied to the plateau sections 35. In some example embodiments, each of the plurality of protrusions 42 may be formed from a dimensional ink. The dimensional ink may be a solvent-based ink, a resin-based ink, a puff ink, a water-based ink, a water-based silicone ink, or the like suitable for additive manufacturing and/or dimensional printing via an additive manufacturing process. The dimensional ink may also include a Polyurethane powder to add texture to the ink. The dimensional ink may also include an organic compound such as Cyclohexanon $(CH_2)_5CO$. The dimensional ink may be clear in color, such that the dimensional ink is transparent or translucent. The dimensional ink may also be pigmented to a predetermined coloration. A mechanoluminescent material may be embedded in the dimensional ink.

More particularly, the dimensional ink may be a hybrid ink containing a polyurethane resin component and a puff ink component. The dimensional ink may also include an organic compound such as Cyclohexanone $(CH_2)_5CO$. The dimensional ink may also be a solvent-based ink containing a polyurethane resin component, an additive component, and an organic compound such as Cyclohexanone $(CH_2)_5CO$; in such examples, the viscosity of the solvent-based ink is from about 150 Decipascal seconds (dPas) to about 600 dPas and the solid content is from about 28% to about 37%.

As shown by example in FIGS. 3 and 9, the protrusions 42 may be additively applied to the exterior surface 13 via an additive manufacturing process. As shown in FIG. 9, each of the plurality of the protrusions 42 has a protrusion terminus 62 that is radially spaced apart from the exterior surface 13 by a protrusion height 64. Said another way, each of the protrusions 42 extends in a second radial direction R2 from the exterior surface 13 to the protrusion terminus 62.

In one example embodiment, the protrusion height 64 may be greater than about 0.05 millimeters. More particularly, the protrusion height 64 may be from about 0.07 millimeters (mm) to about 0.15 millimeters (mm). In such examples, it is beneficial for the height 64 to be at least 0.05 millimeters (mm) and less than 0.15 millimeters (mm) in order to enhance playability of the ball 10. Protrusions 42 having heights 64 in the aforementioned range exhibit the desired grip or contact between a user and/or player's hand or foot and the exterior surface 13 of the ball 10, while still allowing the ball 10 to maintain desired aerodynamic and flight characteristics.

As shown in FIG. 9, each protrusion 42 may be composed of a single layer of dimensional ink that spans the entire protrusion height 64 from the exterior surface 13 to the terminus 62. Each protrusion 42 may, alternatively, be composed of a plurality of layers 68, 70 of dimensional ink, which together span the entire height 64 from the exterior surface 13 to the terminus 62.

The plurality of plateau sections 35, the plurality of indentations 34, 38 (seams 38 and interior channels 34), and optionally the plurality of protrusions 42 may further cooperate to define topographical arrangement 56 across a majority of the exterior surface 13 of the cover 12. Further, in the example configurations shown in FIGS. 3-7, the sports ball 10 has four panels 28, wherein each panel 28 has twenty-seven (27) edges 36, having an edge length 49 of less than 7.5 centimeters, and the resultant sports ball 10, in assembled form, has fifty-four (54) seams 38. The orientation of the seams 38 and the interior channels 34 shown in FIGS. 3-7 promotes a balanced and substantially symmetrical design across the exterior surface 13 of the ball 10, while limiting the seam length 45 of each seam 38 and the channel length 50 of each interior channel 34 to less than 7.5 centimeters, and preferably less than 4.5 centimeters, such that the seams 38 and channels 34 are staggered in orientation on the exterior surface 13 of the sports ball 10 and the respective seam length 45 and channel length 50 are limited.

As evaluated via qualitative assessment based on visual observations, the example balanced topographical designs 56, as shown by example in FIGS. 3-7, having four panels 28 each with twenty-seven edges 36, wherein each edge 36 has an edge length 49 of less than 7.5 centimeters exhibited improved flight characteristics over a sports ball 10 having four panels 28 each having a plurality of edges 36, wherein each edge length 49 of 7.5 centimeters or more, and a substantially identical topographical design 56. For example, a first four-panel sports ball 10 with panels 28 having twenty-seven (27) edges 36 with edge lengths 49 of less than 7.5 centimeters, and therefore having indentation lengths 45, 50 of less than 7.5 centimeters, exhibited improved consistency when kicked in any orientation, and exhibited a more even lift of the ball 10 when kicked, to that of a second four-panel sports ball 10 with panels 28 having nine (9) edges 36 with edge lengths 49 of greater than 7.5 centimeters.

As such, a balanced topographical design 56, such as those shown in FIGS. 3-7, which exhibit indentions 34, 38 (seams 38 and interior channels 34) with an indentation length 45, 50 of less than 7.5 centimeters (corresponding to the edge lengths 49 of the panels 28), and particularly those having an indentation length 45, 50 of less than 4.5 centimeters in any predetermined direction allows the ball 10 to fly or travel substantially the same regardless of the orientation of the ball 10 when kicked. Ball 10 consistency is one property that is often commented on by players. The most consistent balls are the ones with the optimum combination of amplitude and frequency of the varying force coefficients relative to the amount of spin. As such, the tailoring of the topographical design 56 on the ball 10 may allow for optimization of consistency and improved aerodynamics.

Further referring to FIGS. 3-7, the topographical design 56 may be composed of predefined panel arrangements 75, 76, wherein a predefined panel arrangement 75, 76 is defined as the orientation of the plateau sections 35, the seams 38, the interior channels 34, and optionally a plurality of the protrusions 42, on each of the respective panels 28. Each predefined panel arrangement 75, 76 may be comprised of a plurality of sub-panel arrangements positioned on a plurality of panel sections 73, 78, 79. In an example twelve panel ball, the topographical design 56 may be comprised of six pairs of predefined panel arrangements. In this example, corresponding panel arrangements would be disposed opposite one another on the ball 10, when the respective panels 28 are coupled at the seams 38. In an example four panel ball 10, wherein each panel 28 is essentially comprised of three conventional pentagon-shaped panels 28, each of the four panels 28 contains a plurality of sub-panel arrangements positioned in a specified orientation on three respective panel sections 73, 78, 79.

More particularly, referring to FIGS. 3-7, the ball 10 may comprise four panels 28. In the four-panel ball 10 examples of FIGS. 3-7 the panels 28 may be coupled, such that the orientation of the seams 38 and interior channels 34 promotes a balanced design 56 across the exterior surface 13 of the ball 10. Said another way, the topographical design 56 is both balanced and symmetrical in that each panel 28 defines substantially the same number of plateau sections 35, seams 38, and interior channels 34 as each of the other panels 28. Moreover, each seam 38 present on one portion of the ball 10 has no more than one corresponding opposite seam 38 disposed opposite thereof on the exterior surface 13 of the ball. Likewise, each interior channel 34 present on one portion of the ball 10 may have a corresponding opposite debossed feature 34 disposed opposite thereof of the ball 10.

With reference to the example topographic designs 56 shown in FIGS. 3-7, the indentations 38, 34 comprise a plurality of adjacent and interconnected closed polygons 46, wherein each indentation 34, 38 comprises one side of at least one of the closed polygons 46 of the plurality of closed polygons 46.

In one example, illustrated in FIG. 3, the sports ball 10 is a four-panel sports ball, wherein each panel 28, when disposed in a planar configuration, prior to assembly, has twenty-seven (27) edges 36, the topographical arrangement 56 is formed by the resultant fifty-four (54) seams 38 coupling the respective panel edges 36, and optionally a plurality of protrusions 42, with no interior channels 34 or other debossed features. In such an example, the plurality of seams 38 form the plurality of adjacent and interconnected closed polygons 46. Each closed polygon 46 may comprise an interior defined as a plateau section 35. A plurality of protrusions 42 may be additively applied to and/or disposed on each plateau section 35, such that the protrusions 42 ordered in a plurality of groupings of protrusions 42, wherein each grouping comprises a series of concentric shapes, which are illustrated as pentagons in FIG. 3.

Figure 4:
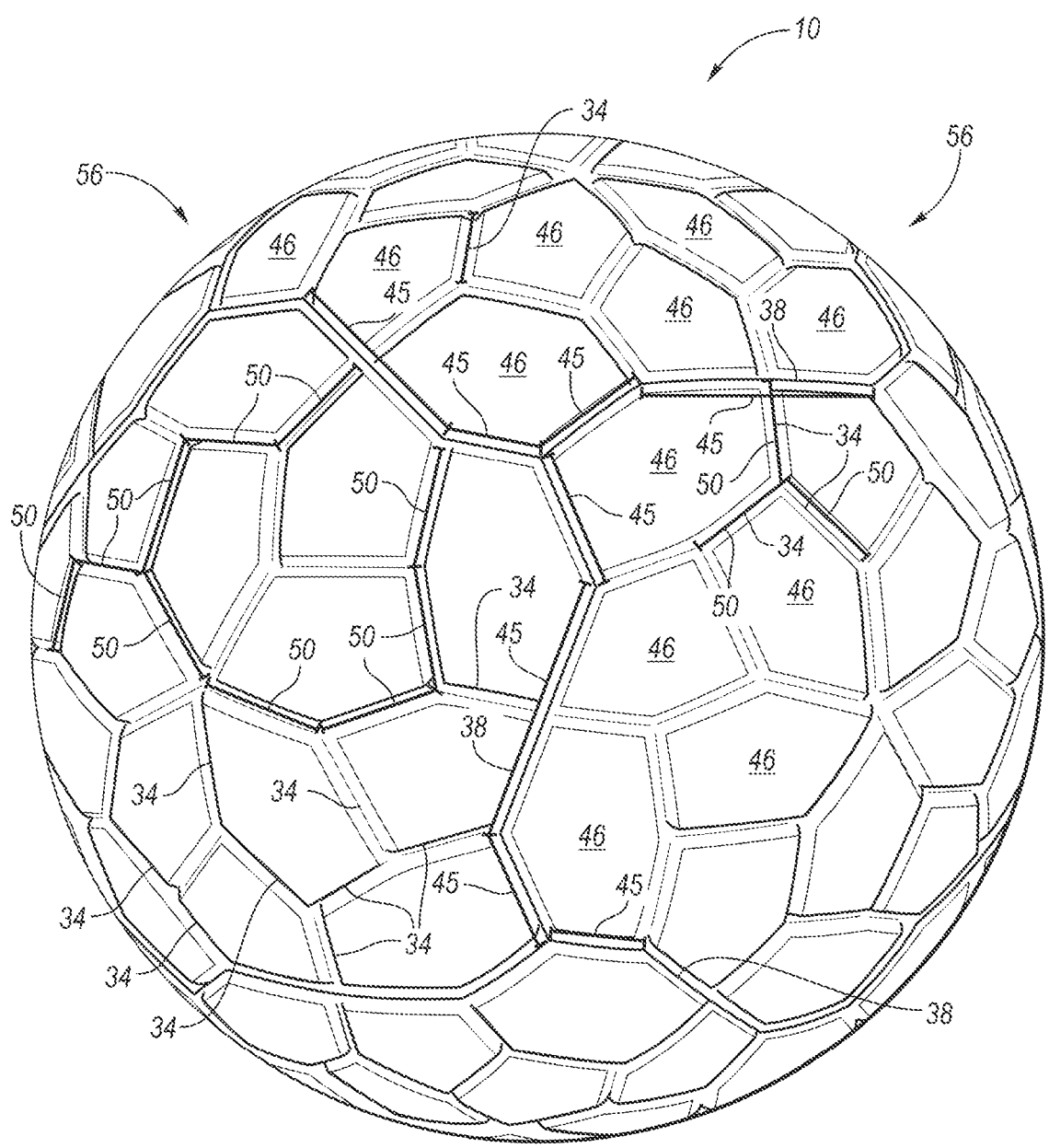
FIG. 4 is a schematic perspective view of the first example sports ball of FIG. 3, wherein the cover further defines a plurality of interior channels or debossed features.

In another example, illustrated in FIG. 4-5, the sports ball 10 is a four-panel sports ball, wherein each panel 28, when disposed in a planar configuration, prior to assembly, has twenty-seven (27) edges 36, the topographical arrangement 56 is formed via a plurality of indentations 34, 38 and optionally a plurality of protrusions 42 (not shown). More particularly, the seams 38 and the interior channels 34 cooperate to form a plurality of adjacent and interconnected closed polygons 46, wherein each respective seam 38 and each respective interior channel 34 comprises one side of at least one of the closed polygons 46. In such an example, the seam lengths 45 and the channel lengths 50 are substantially the same, and the seam lengths 45 and the channel lengths 50 are each less than 7.5 centimeters, and preferably less than 4.5 centimeters. In one example, as shown in FIGS. 4-5, each of the seam lengths 45 and each of the channel lengths 50 are consistent in length across the entirety of the exterior surface 13 of the sports ball 10 and are from about 2.5 centimeters to about 4.0 centimeters. In such an example, each panel 28 comprises approximately forty-five (45) closed polygons 46 and the ball 10 comprises approximately one hundred and eighty (180) closed polygons 46.

In such an example, a plateau section 35 comprises an interior of each of the closed polygons 46. A plurality of protrusions 42 (FIG. 3) comprised of dimensional ink may be additively applied to the plateau sections 35. In an example that includes protrusions 42, each protrusion 42 is formed in a substantially similar shape to that of the closed polygons 46, and the plurality of protrusions 42 are disposed on the respective plateau section 35 in a concentric arrangement.

Figure 6:
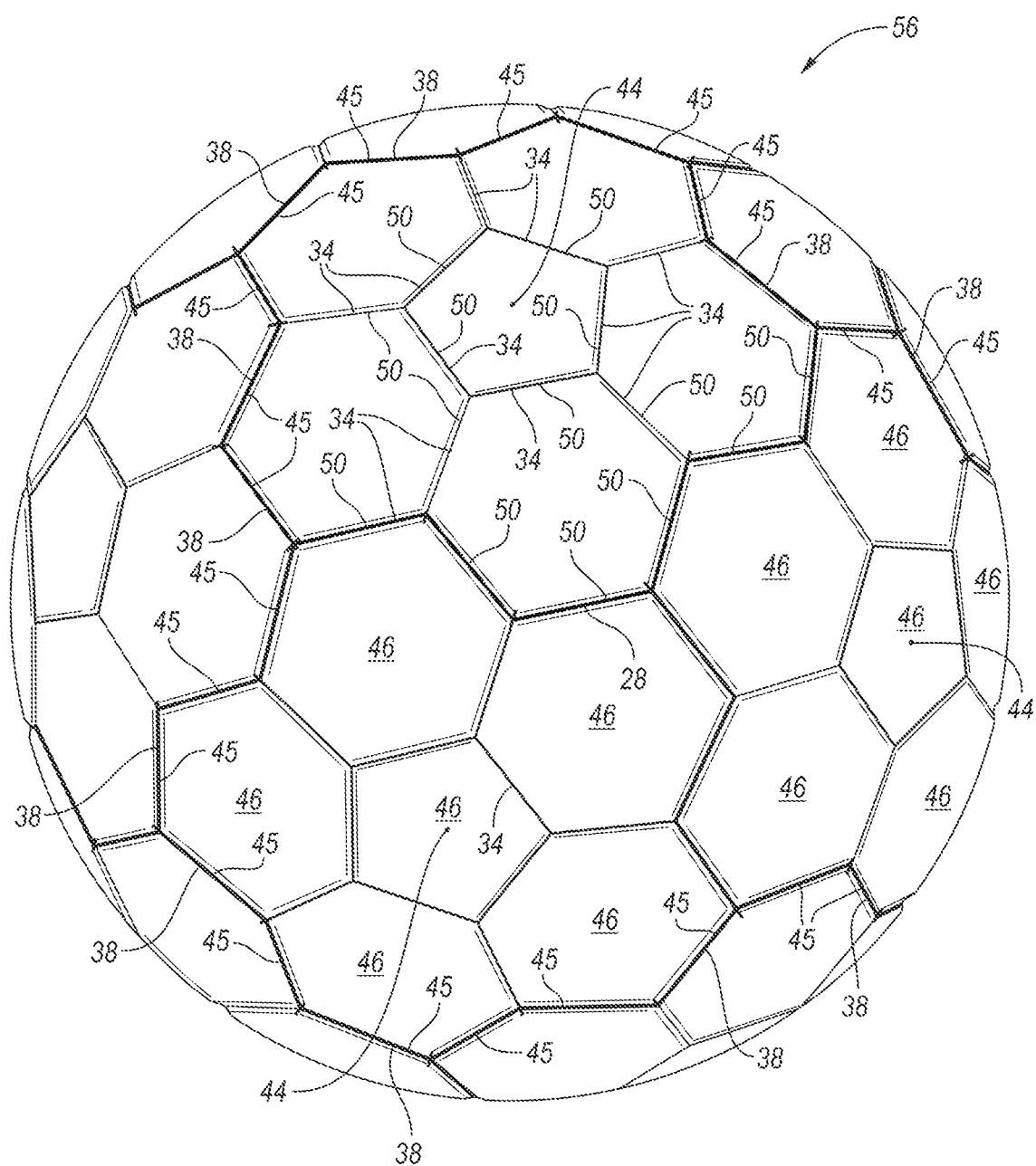
FIG. 6 is a schematic perspective view of a second example inflatable sports ball, wherein the cover defines a plurality of adjoining panels, coupled via a plurality of seams, and a plurality of interior channels.

In another example, illustrated in FIGS. 6-7, the sports ball 10 is a four-panel sports ball, wherein each panel 28, when disposed in a planar configuration, prior to assembly, has twenty-seven (27) edges 36, the topographical arrangement 56 is formed of a plurality of indentations 34, 38 and optionally a plurality of protrusions 42 (not shown). More particularly, the seams 38 and the interior channels 34 cooperate to form a plurality of adjacent and interconnected closed polygons 46, wherein each respective seam 38 and each respective interior channel 34 comprises one side of at least one of the closed polygons 46. In such an example, the plurality of closed polygons 46 comprises a truncated pentagonal hexecontahedron 44 across the exterior surface 13 of the sports ball 10. Namely, the topographical arrangement 56 is an order-5 truncated pentagonal hexecontahedron. An order-5 truncated pentagonal hexecontahedron is defined as a convex polyhedron with seventy-two faces, sixty (60) hexagons and twelve (12) pentagons (formed by the indentations 34, 38), wherein each of the twelve (12) pentagons is surrounded by five hexagons, wherein each of the pentagons is identical in size to each of the other pentagons and each of the hexagons is identical in size to each of the other hexagons. Each panel 28 comprising three (3) pentagons and fifteen (15) hexagons. Accordingly, each closed polygon 46 is either a pentagon or a hexagon, and the topographical arrangement 56 comprises seventy-two (72) closed polygons 46. In such an example, the seam lengths 45 and the channel lengths 50 are substantially the same, and the seam lengths 45 and the channel lengths 50 are each less than 7.5 centimeters, and preferably less than 4.5 centimeters. In one example, as shown in FIGS. 6-7, each of the seam lengths 45 and each of the channel lengths 50 are about 3.0 centimeters.

In an example, as illustrated in FIGS. 6-7, a plateau section 35 comprises an interior of each of the closed polygons 46. In an example that includes protrusions 42, a plurality of protrusions 42 comprised of dimensional ink may be additively applied to the plateau sections 35, which may be formed in a substantially similar shape to that of the closed polygons 46, namely one of a pentagon or a hexagon, and the plurality of protrusions 42 are disposed on the respective plateau section 35 in a concentric arrangement.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Benefits, other advantages, and solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claims.

The invention claimed is:

1. An inflatable sports ball comprising:
an interior bladder;
a cover disposed about the interior bladder, the cover comprising an outer substrate that defines an exterior surface of the inflatable sports ball, the outer substrate comprising four substantially similar adjoining panels, wherein each of the respective adjoining panels defines a plurality of panel edges, and wherein each edge extends in a predetermined edge direction along an edge length;
wherein each panel edge of one of the adjoining panels is configured to be joined with a panel edge of another of the adjoining panels via a seam, and wherein the seam has a seam terminus that is radially spaced apart from the exterior surface, in a first radial direction, by a seam depth;
wherein the edge length is less than 7.5 centimeters; and
wherein each adjoining panel has a first panel edge that extends in a first predetermined edge direction, and wherein the first predetermined edge direction is different than the predetermined edge direction of each of the other panel edges of the respective adjoining panel, such that first predetermined edge direction is obliquely angled with respect to each of the other predetermined edge directions.

2. The inflatable sports ball of claim 1 wherein each panel defines twenty-seven panel edges.

3. The inflatable sports ball of claim 2 wherein the edge length is less than 4.5 centimeters.

4. The inflatable sports ball of claim 3 wherein each panel further defines a plurality of interior channels, each of the interior channels having an interior channel terminus that is radially spaced apart in the first radial direction from the exterior surface by a channel depth, such that each interior channel comprises a debossed feature;
wherein each interior channel extends in a predetermined channel direction along a channel length; and
wherein the channel length is less than 4.5 centimeters.

5. The inflatable sports ball of claim 4 wherein each adjoining panel has a first interior channel that extends in a first predetermined channel direction; and
wherein the first predetermined channel direction of the predetermined channel directions of the interior channels is different than the predetermined channel direction of each of the other interior channels of the respective adjoining panel, such that the first predetermined channel direction is obliquely angled with respect to each of the other predetermined channel directions.

6. The inflatable sports ball of claim 5 wherein:
the first predetermined channel direction is different than the first predetermined edge direction;
the first predetermined channel direction is different than the predetermined edge direction of each of the other panel edges of the respective adjoining panel; and
the predetermined first edge direction is different than the predetermined channel direction of each of the other interior channels of the respective adjoining panel.

7. The inflatable sports ball of claim 6 wherein each predetermined interior channel direction is obliquely angled with respect to each predetermined edge direction of the respective adjoining panel.

8. The inflatable sports ball of claim 4 wherein each seam and the plurality of interior channels collectively form a topographical arrangement across the exterior surface of the inflatable sports ball, and wherein the topographical arrangement comprises a plurality of adjacent and interconnected closed polygons, wherein each seam and each interior channel comprises one side of at least one of the closed polygons.

9. The inflatable sports ball of claim 8 wherein the topographical arrangement comprises from about 72 closed polygons to about 180 closed polygons.

10. The inflatable sports ball of claim 9 wherein:
the closed polygons are arranged as a truncated pentagonal hexecontahedron; and
the topographical arrangement comprises seventy-two closed polygons.

11. The inflatable sports ball of claim 10 wherein the edge length is about 3.0 centimeters; and wherein the channel length is about 3.0 centimeters.

12. The inflatable sports ball of claim 10 wherein the cover further includes an intermediate structure, the intermediate structure being disposed between the outer substrate and the interior bladder, wherein the outer substrate is bonded to the intermediate structure at each interior channel.

13. The inflatable sports ball of claim 12 wherein the intermediate structure includes a first intermediate cover layer and a second intermediate cover layer, wherein:
the first intermediate cover layer is positioned between the outer substrate and the second intermediate cover layer;
the second intermediate cover layer is positioned between the first intermediate cover layer and the interior bladder; and
the outer substrate is bonded directly to the second intermediate cover layer at each interior channel.

14. The inflatable sports ball of claim 12 wherein the cover further defines:
a plurality of plateau sections positioned between the seams and the interior channels;
a plurality of protrusions comprised of a plurality of layers of a dimensional ink disposed on the plateau sections, wherein each protrusion extends in a second radial direction from the exterior surface to a protrusion terminus that is radially spaced apart from the exterior surface by a protrusion height that is greater than 0.05 millimeters; and
wherein the second radial direction is opposite the first radial direction.

15. An inflatable sports ball comprising:
an interior bladder;
a cover disposed about the interior bladder, the cover comprising an outer substrate that defines an exterior surface of the inflatable sports ball, wherein the outer substrate further comprises four adjoining panels coupled at a plurality of panel edges via a plurality of seams, wherein each panel comprises twenty-seven edges and the cover comprises fifty-four seams, and wherein each panel further defines:
a plurality of interior channels, wherein each interior channel has a channel terminus that is radially spaced apart from the exterior surface, in a first radial direction, by a channel depth, and wherein each interior channel extends along a channel length that is less than 4.5 centimeters;
a plurality of plateau sections disposed between the interior channels;
wherein each panel edge extends along an edge length that is less than 4.5 centimeters;
wherein the edge length and the channel length are substantially identical; and
wherein each adjoining panel has a first panel edge that extends in a first predetermined edge direction, and wherein the first predetermined edge direction is different than the predetermined edge direction of each of the other panel edges of the respective adjoining panel, such that first predetermined edge direction is obliquely angled with respect to each of the other predetermined edge directions.

16. The inflatable sports ball of claim 15 wherein the plurality of seams, the plurality of interior channels, and the plurality of plateau sections form a topographical arrangement on an exterior surface of the inflatable sports ball;
wherein topographical arrangement comprises a plurality of adjacent and interconnected closed polygons; and
wherein each of the interior channels and each of the seams respectively comprise one side of at least one of the closed polygons.

17. The inflatable sports ball of claim 16 wherein the topographical arrangement comprises 72 closed polygons, such that the closed polygons are arranged as an order-five truncated pentagonal hexecontahedron.

18. The inflatable sports ball of claim 17 wherein the cover further defines:
a plurality of protrusions comprised of a plurality of layers of a dimensional ink disposed on the plateau sections, wherein each protrusion extends in a second radial direction from the exterior surface to a protrusion terminus that is radially spaced apart from the exterior surface by a protrusion height that is greater than 0.05 millimeters; and
wherein the second radial direction is opposite the first radial direction.

19. The inflatable sports ball of claim 18 wherein the cover further includes an intermediate structure, the intermediate structure being disposed between the outer substrate and the interior bladder, the intermediate structure including a first intermediate cover layer and a second intermediate cover layer, wherein:
a first intermediate cover layer is positioned between the outer substrate and the second intermediate cover layer;
the second intermediate cover layer is positioned between the first intermediate cover layer and the interior bladder; and
the outer substrate is bonded directly to the second intermediate cover layer at each interior channel.

* * * * *